US010694519B2

United States Patent
Ben-Shlomo et al.

(10) Patent No.: US 10,694,519 B2
(45) Date of Patent: *Jun. 23, 2020

(54) TIME-DIVISION DUPLEXING (TDD) IN DISTRIBUTED COMMUNICATIONS SYSTEMS, INCLUDING DISTRIBUTED ANTENNA SYSTEMS (DASS)

(71) Applicant: Corning Optical Communications LLC, Charlotte, NC (US)

(72) Inventors: Dror Ben-Shlomo, Reut (IL); Isaac Shapira, Petach Tikva (IL)

(73) Assignee: Corning Optical Communications LLC, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/374,389

(22) Filed: Apr. 3, 2019

(65) Prior Publication Data
US 2019/0230662 A1  Jul. 25, 2019

Related U.S. Application Data

(63) Continuation of application No. 15/975,153, filed on May 9, 2018, now Pat. No. 10,257,828, which is a (Continued)

(51) Int. Cl.
*H04W 72/04* (2009.01)
*H04B 1/48* (2006.01)
(Continued)

(52) U.S. Cl.
CPC .......... *H04W 72/0446* (2013.01); *H04B 1/48* (2013.01); *H04L 5/14* (2013.01); *H04W 72/0406* (2013.01); *H04B 17/318* (2015.01)

(58) Field of Classification Search
CPC .......... H04W 72/0446; H04W 72/0406; H04L 5/14; H04B 1/48; H04B 17/318
See application file for complete search history.

(56) References Cited

U.S. PATENT DOCUMENTS

2008/0144543 A1*  6/2008  Hunton .................... H04B 1/48
                                                         370/280
2011/0268446 A1   11/2011  Cune et al.
(Continued)

FOREIGN PATENT DOCUMENTS

CN  201869169 U  6/2011
WO  2008076248 A1  6/2008
(Continued)

OTHER PUBLICATIONS

International Search Report of the Internaitonal Searching Authority; PCT/IL2014/050526; dated Sep. 2, 2014; 3 Pages; European Patent Office.

*Primary Examiner* — Shailendra Kumar
(74) *Attorney, Agent, or Firm* — C. Keith Montgomery

(57) ABSTRACT

Time-division duplexing (TDD) in distributed communications systems, including distributed antenna systems (DASs) is disclosed. In one embodiment, a control circuit is provided and configured to control the TDD transmit mode of a DAS to control the allocation of time slots for uplink and downlink communications signal distribution in respective uplink path(s) and downlink path(s). The control circuit includes separate power detectors configured to detect either a transmit power level in a downlink path or a receive power level in an uplink path. If the transmit power detected in the downlink path is greater than receive power detected in the uplink path, the control circuit switches the TDD transmit mode to the downlink direction. In this manner, the control circuit does not have to control the TDD transmit mode based solely on detected power in the downlink path, where a directional coupler may leak uplink power in the downlink path.

17 Claims, 4 Drawing Sheets

Related U.S. Application Data continuation of application No. 14/962,338, filed on Dec. 8, 2015, now Pat. No. 9,974,074, which is a continuation of application No. PCT/IL2014/050526, filed on Jun. 11, 2014.

(60) Provisional application No. 61/834,075, filed on Jun. 12, 2013.

(51) Int. Cl.
*H04L 5/14* (2006.01)
*H04B 17/318* (2015.01)

(56) References Cited

U.S. PATENT DOCUMENTS

| | | | | |
|---|---|---|---|---|
| 2013/0107763 A1* | 5/2013 | Uyehara | ................ | H04B 7/024 370/278 |
| 2013/0165067 A1* | 6/2013 | DeVries | ............... | H04B 1/1036 455/307 |
| 2013/0272170 A1 | 10/2013 | Chatterjee et al. | | |

FOREIGN PATENT DOCUMENTS

| | | | |
|---|---|---|---|
| WO | 2009012614 A1 | | 1/2009 |
| WO | WO 2009/012614 A1 | * | 1/2009 |
| WO | 2012151650 A1 | | 11/2012 |

* cited by examiner

TIME-DIVISION DUPLEXING (TDD) IN DISTRIBUTED COMMUNICATIONS SYSTEMS, INCLUDING DISTRIBUTED ANTENNA SYSTEMS (DASS)

CROSS-REFERENCE TO RELATED APPLICATIONS

This application is a continuation of U.S. application Ser. No. 15/975,153, filed May 9, 2018, which is a continuation of U.S. application Ser. No. 14/962,338, filed Dec. 8, 2015, now U.S. Pat. No. 9,974,074, which is a continuation of International Application No. PCT/IL14/050526, filed on Jun. 11, 2014, which claims the benefit of priority to U.S. Provisional Application No. 61/834,075, filed on Jun. 12, 2013, all applications being incorporated herein by reference.

BACKGROUND

The technology of the disclosure relates to distributed antenna systems configured to provide communications signals over a communications medium to and from one or more remote units for communicating with client devices.

No admission is made that any reference cited herein constitutes prior art. Applicant expressly reserves the right to challenge the accuracy and pertinency of any cited documents.

Distributed antenna systems (DASs) are effective when deployed inside buildings or other environments where client devices may not otherwise receive radio-frequency (RF) signals from a base station or other source. DASs can be used to provide coverage for applications such as public safety, cellular telephony, wireless local access networks (LANs), location tracking, and medical telemetry inside buildings and over campuses. A typical DAS establishes a number of RF antenna coverage areas, also referred to as "antenna coverage areas." The antenna coverage areas are formed by remotely distributed antenna units (RAUs), which are sometimes referred to as remote units (RUs). A number of remote units are arranged to create an array of relatively small antenna coverage areas, with each RAU typically accommodating a small number of wireless client device users. This arrangement thus provides a uniform high quality signal and high throughput for wireless users.

Time-division duplexing (TDD) refers to duplex communication links where uplink is separated from downlink by the allocation of different time slots in the same frequency band. In TDD, users are allocated time slots for uplink and downlink transmission. When a DAS serves TDD wireless protocols, it must identify whether a radio source is transmitting (i.e., is in TDD Tx mode) or receiving (TDD Rx mode) and toggle its transmit/receive circuits accordingly. Conventional WiFi systems using TDD, for example, determine whether to toggle to TDD transmit (Tx) mode or stay in TDD receive (Rx) mode based on the output of a power detector that senses the power level at the radio port side of the DAS.

In this regard, FIG. 1 illustrates one such conventional system coupled to a radio source 10, such as a base station or transceiver. In FIG. 1, a TDD DAS head end 12 of a DAS 14 is provided. The TDD DAS head end 12 may also be a TDD repeater. The TDD DAS head end 12 receives TDD communications signals 16 in the form of TDD downlink communications signals 16D from the radio source 10 and provides TDD uplink communication signals 16U to the radio source 10. In the TDD DAS head end 12, a power detector 18 senses the power level of TDD communications signals 16 at the radio port side of the TDD DAS head end 12 to determine whether to toggle to TDD transmit (Tx) mode or stay in TDD receive (Rx) mode. The default status of the TDD DAS head end 12 is TDD receive (Rx) mode, where the DAS 14 is set to transfer signals in the uplink direction. When the power detector 18 detects power of the TDD communication signals 16 above a certain threshold, the assumption is that the power is sourced from TDD downlink communications signals 16D received from the radio source 10. This is because the power of the TDD downlink communications signal 16D is typically lower (e.g., 30-40 dB lower) than the power of the TDD uplink communications signals 16U due to loss. In response to the power detector 18 detecting power of the TDD communications signals 16 above a certain threshold, the TDD DAS head end 12 toggles input switch 20 and antenna switch 22 to TDD transmit (Tx) mode, where its circuits are set to transfer signals in the downlink direction.

One of the drawbacks of the DAS 14 in FIG. 1 is that the power generated by a receive (Rx) Amp 24 can leak through the directional coupler 26 to the power detector 18. For example, the directional coupler 26 may only have a directivity of up to 15 or 20 dB, but the difference in power between the TDD downlink communications signals 16D and the TDD uplink communications signals 16U may be greater than the directivity capability of the directional coupler 26. If power leaking from the receive (Rx) Amp 24 is high enough, it can cause the level comparator 28 to toggle the input switch 20 and the antenna switch 22 from TDD receive (Rx) mode to TDD transmit (Tx) mode even when the radio source 10 is not transmitting.

SUMMARY

Embodiments disclosed in the detailed description include time-division duplexing (TDD) in distributed communications systems, including distributed antenna systems (DASs). Related circuits, systems, and methods are also disclosed. In one embodiment, a control circuit is provided in a TDD distributed communications system in the form of a TDD DAS, for example a TDD DAS head end. The control circuit is configured to control the TDD transmit mode of the DAS to control the allocation of time slots for uplink and downlink communications signal distribution in a respective uplink path(s) and downlink path(s). The control circuit includes separate power detectors configured to detect either a transmit power level in the downlink path or a receive power level in the uplink path. In this manner, the transmit power in the downlink path can be detected separately form the receive power in the uplink path. If the transmit power detected by a power detector in the downlink path is greater than the receive power detected by another power detector in the uplink path, the TDD transmit mode is switched to the downlink direction. In this manner, the control circuit does not have to rely on an assumption that the TDD transmit mode should be in uplink direction based solely on detected power in the downlink path, where a directional coupler may leak uplink power to the downlink path.

One embodiment of the disclosure relates to a control circuit controls switching in a system supporting time-division duplexing (TDD). The control circuit comprises a first power detector configured to determine a first power level from a radio source, a second power detector configured to determine a second power level in an uplink path, and a receive/transmit comparator. The receive/transmit comparator is coupled to the first power detector and to the second power detector, and compares the first power level to the second power level to provide an indication that the system should be switched to a TDD transmit mode when the first power level exceeds the second power level.

An additional embodiment of the disclosure relates to a distributed communication system capable of supporting time-division duplexing (TDD) comprises a central unit configured to receive a plurality of downlink signals from at least one radio source, a plurality of remote units each configured to receive downlink signals from the central unit, and to return uplink signals to the central unit, and a control circuit for controlling TDD switching in the distributed communication system. The control circuit comprises a first power detector configured to determine a first power level from the at least one radio source, a second power detector configured to determine a second power level from an uplink path, and a receive/transmit comparator. The receive/transmit comparator is coupled to the first power detector and to the second power detector, and compares the first power level to the second power level to provide an indication that the distributed communication system should be switched to a TDD transmit mode when the first power level exceeds the second power level.

The central units and remote units disclosed herein can be configured to support both RF communications services and digital data services. These communications services can be wired or wireless communications services that are typically communicated wirelessly, but may be provided over non-wireless medium (e.g., electrical conductor and/or optical fiber). The RF communications services and digital data services can be provided over any type of communications medium, including electrical conductors and optical fiber to wireless client devices, such as remote units for example. Examples of RF communications services are cellular services and radio communications services. Examples of digital data services include LAN using Ethernet, WLAN, WiMax, WiFi, Digital Subscriber Line (DSL), telephony, WCDMA, and LTE, which can support voice and data. Digital data signals can be provided over separate communications media for providing RF communications services, or over a common communications medium with RF communications signals.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both foregoing general description and the following detailed description are merely exemplary, and are intended to provide an overview or framework to understand the nature and character of the claims.

The accompanying drawings are included to provide a further understanding, and are incorporated into and constitute a part of this specification. The drawings illustrate one or more embodiment(s), and together with the description serve to explain principles and operation of the various embodiments.

DETAILED DESCRIPTION

Various embodiments will be further clarified by the following examples.

Figure 1:
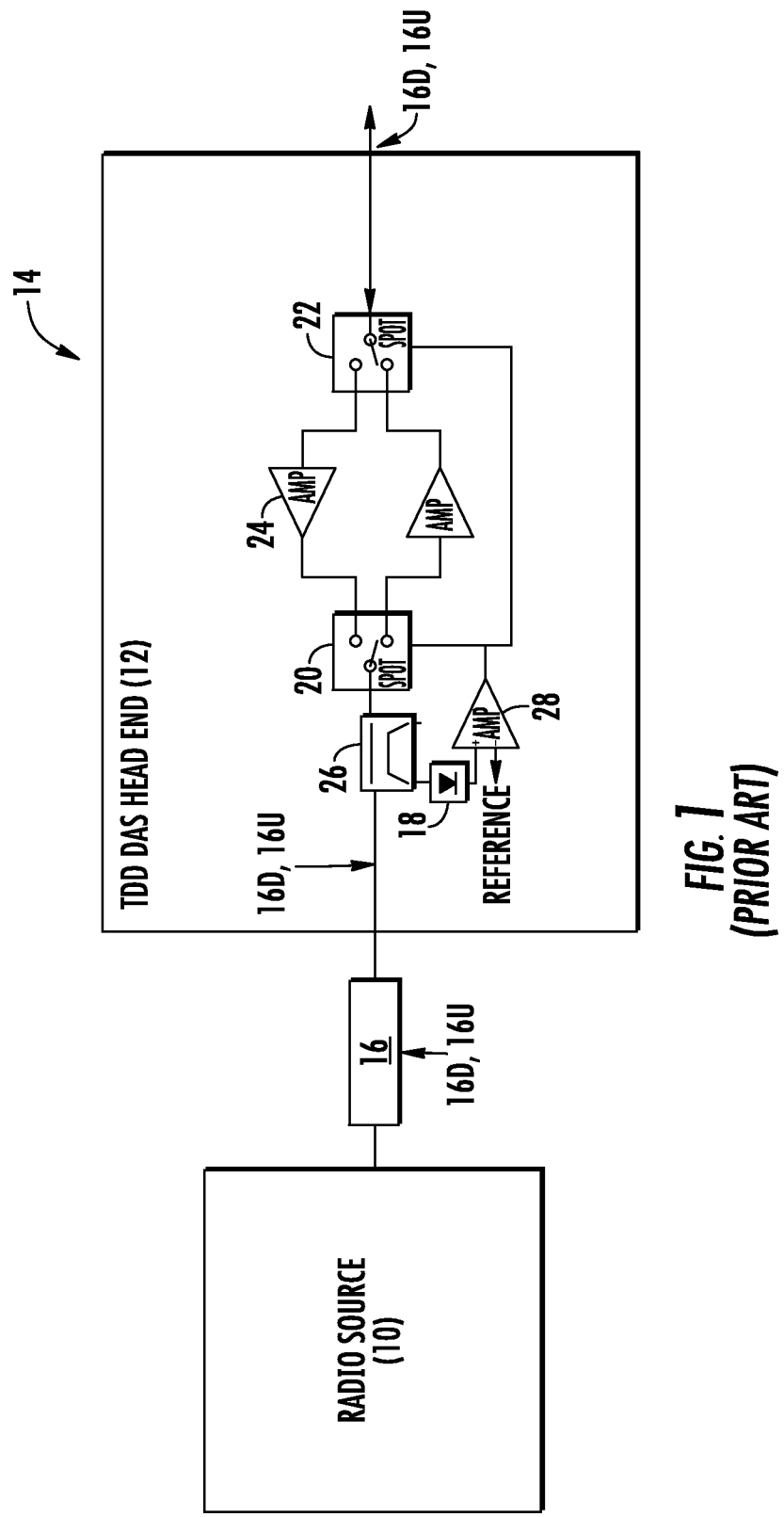
FIG. 1 is a schematic diagram of a prior art implementation of time-division duplexing (TDD)
Figure 2:
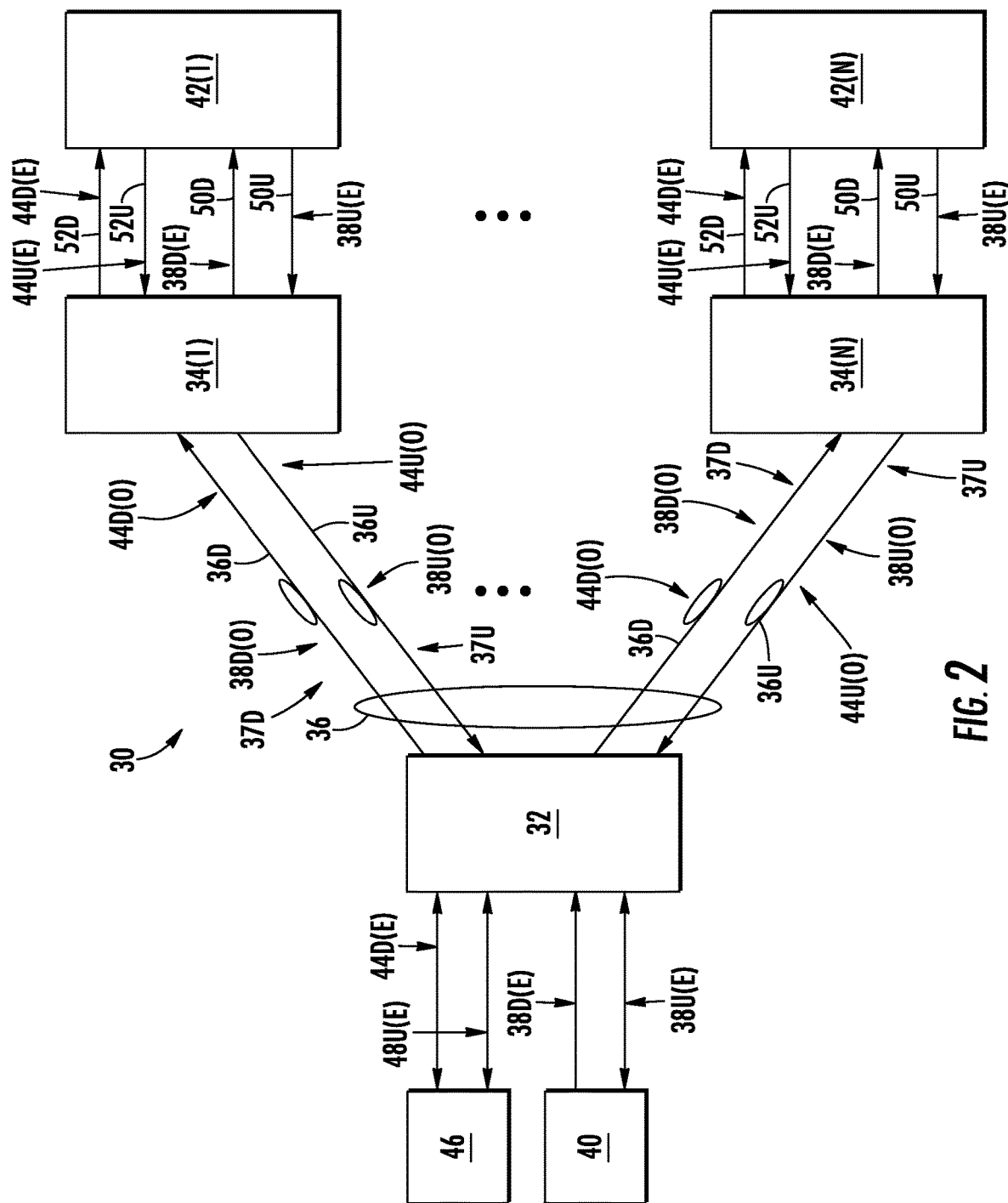
FIG. 2 is a schematic diagram of an exemplary point to multi-point optical fiber-based distributed antenna system configured to distribute radio-frequency (RF) communications services and management services.
Figure 3:
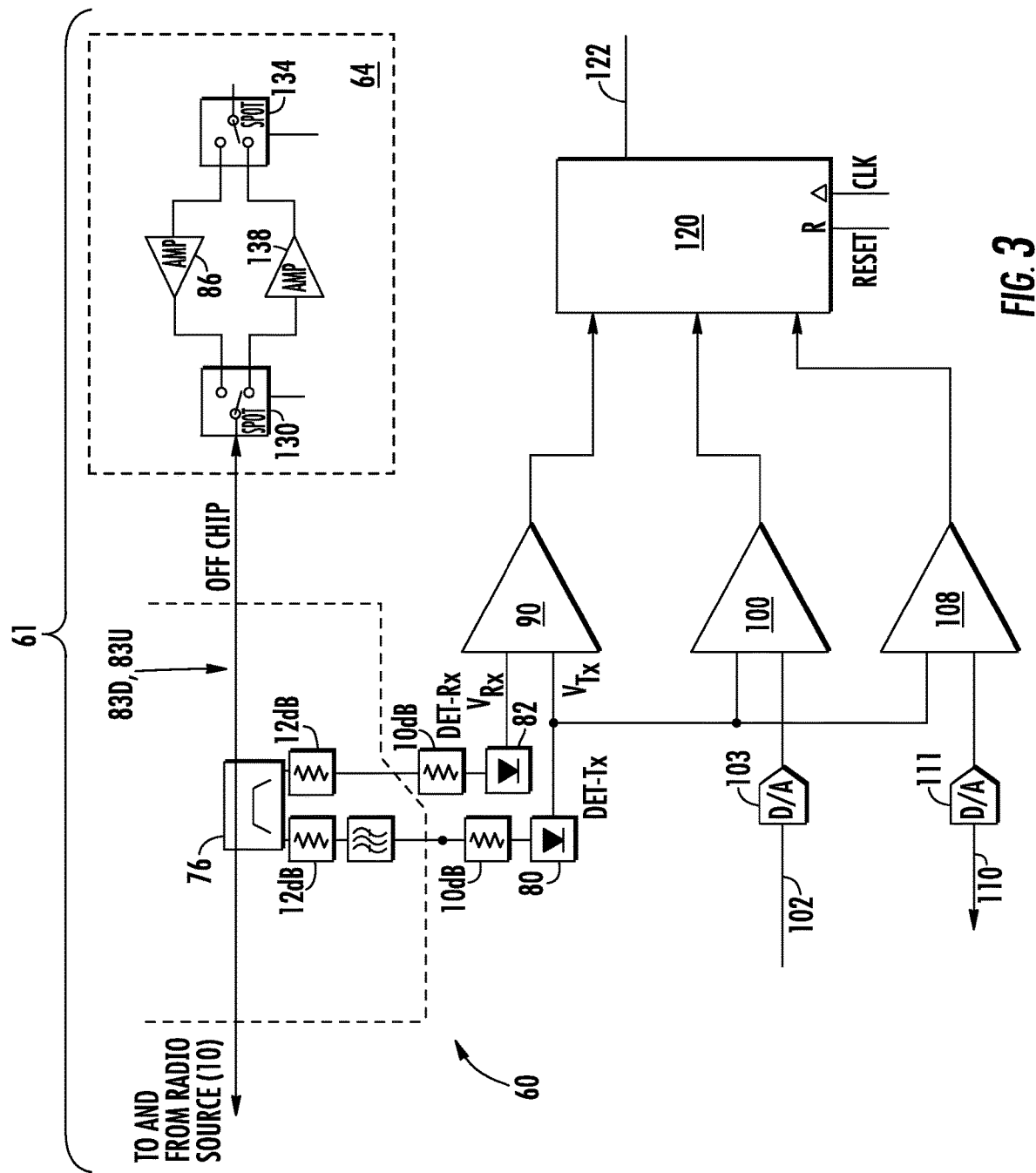
FIG. 3 illustrates a control circuit for controlling TDD switching in a distributed communication system according to one embodiment.

Before discussing a method of controlling time-division duplexing (TDD) switching in a distributed antenna system (DAS) with regard to FIG. 3, a general overview of a distributed communications system in the form of a DAS 30, in FIG. 2 is first provided. In this regard, the DAS 30 in FIG. 2 includes a central unit 32. The central unit 32 is communicatively coupled to one or more remote units 34(1)-34(N) via an optical fiber communications medium 36. Thus, in this example, the DAS 30 is an optical fiber-based distributed antenna system. However, the present disclosure is not limited to an optical fiber-based distributed antenna system. Other communications mediums including twisted pair conductors (e.g., CAT 5/6/7 cable) and coaxial cables could be employed or employed in conjunction with optical fiber. The DAS 30 is configured to distribute RF communications signals and management signals. In this regard, with regard to distribution of RF communications signals, the central unit 32 is configured to receive downlink communications signals 38D, which may be downlink RF communications signals, from a RF communications network, such as through a base station 40 as an example. In this embodiment, the downlink communications signals 38D are downlink electrical communications signals 38D(E). The downlink electrical communications signals 38D(E), which may be downlink electrical RF communications signals, can be combined and converted to downlink optical communications signals 38D(O), which may be downlink optical RF communications signals, by the central unit 32 in this embodiment. The downlink optical communications signals 38D(O) are split and distributed by the central unit 32 over at least one downlink optical fiber 36D to each of the remote units 34(1)-34(N) to provide one or more RF communications services to the client devices 42(1)-42(N) in wired and/or wireless communication with the remote units 14(1)-14(N).

With continuing reference to FIG. 2, the remote units 34(1)-34(N) convert the downlink optical communications signals 38D(O) back to downlink electrical communications signals 38D(E), and communicate the downlink electrical communications signals 38D(E) to one or more client devices 42(1)-42(N) to provide the one more RF communications services to the client devices 42(1)-42(N). The remote units 34(1)-34(N) can be configured to communicate through wired or wireless communications to the client devices 42(1)-42(N). For example, if the remote units 34(1)-34(N) are configured to be directly coupled to one client device 42(1)-42(N) each, up to 'N' client devices 42(1)-42(N) may be connected to the remote units 34(1)-34(N) in the DAS 30.

The remote units 34(1)-34(N) are also configured to receive uplink communications signals 38U, which may be uplink RF communications signals, from the client devices 42(1)-42(N) to be distributed to the central unit 32 and the base station(s) 40. The uplink communications signals 38U are received from the client devices 42(1)-42(N) as uplink electrical communications signals 38U(E), which may be uplink electrical RF communications signals, which are combined and converted to uplink optical communications signals 38U(O), which may be uplink optical RF communications signals. The remote units 34(1)-34(N) distribute the uplink communications signals 38U(O) over at least one uplink optical fiber 36U to the central unit 32. The central unit 32 receives and converts the uplink optical communications signals 38U(O) back to uplink electrical communications signals 38U(E). The central unit 32 provides the uplink electrical communications signals 38U(E) to the base station(s) 40 to support the one or more RF communications services from the client devices 42(1)-42(N).

With continuing reference to FIG. 2, note that one common downlink optical fiber 36D may be provided between the central unit 32 and the remote units 34(1)-34(N) to carry downlink communications signals in a point-to-multipoint communications configuration. Similarly, one common uplink optical fiber 36U may be provided between the central unit 32 and the remote units 34(1)-34(N) to carry uplink communications signals in a point-to-multipoint communications configuration. Bi-directional communications in the downlink and uplink directions are provided in this embodiment of the DAS 30 in FIG. 2 by providing separate downlink optical fiber(s) 36D and uplink optical fiber(s) 36U in a respective downlink path 37D and uplink path 37U. Further, due to the point-to-multipoint configuration of the DAS 30 in FIG. 2, the embodiments disclosed provide time-division multiplexing (TDM) of management signals distributed in the DAS 30 to ensure that the management signals do not interfere with providing bi-directional, full-duplex communications. Alternatively, individual downlink optical fibers 36D may be provided between the central unit 32 and each remote unit 34(1)-34(N) to carry downlink communications signals in a point-to-point communications configuration. The individual uplink optical fibers 36U may be provided between the central unit 32 and each remote unit 34(1)-34(N) to carry uplink communications signals in a point-to-point communications configuration.

As a further option, the downlink optical fiber 36D and uplink optical fiber 36U could be provided as a single optical fiber (not shown) to carry both downlink and uplink signals. Time-division multiplexing of the downlink and uplink signals may be employed to allow the downlink and uplink signals to be communicated over a single optical fiber. Wave-division multiplexing (WDM), such as discussed in U.S. patent application Ser. No. 12/892,424 entitled "Providing Digital Data Services in Optical Fiber-based Distributed Radio Frequency (RF) Communications Systems, And Related Components and Methods," incorporated herein by reference in its entirety, may also be employed in this scenario to prevent collisions between downlink and uplink communications signals in the same or overlapping frequency bands. Further, U.S. patent application Ser. No. 12/892,424 also discloses distributed digital data communications signals in a distributed antenna system which may also be distributed in the DAS 30 either in conjunction with RF communications signals or not.

With reference back to FIG. 2, the central unit 32 of the DAS 30 is also configured to distribute management signals between one or more sources, such as between a management controller 46, and the remote units 34(1)-34(N). The management controller 46 may be a computer or console as non-limiting examples. For example, the management controller 46 may be configured to provide management signals to perform a variety of tasks or applications. Examples of management signals that may be distributed in the DAS 30 include configuration signals, control signals, gain control signals, monitoring signals, and configuration signals, fault signals, and alarm signals. The management signals are not for providing RF communications services between the base station(s) 40 and the client devices 42(1)-42(N). The management signals may be communicated according to any protocol desired, such as the Ethernet protocol.

The central unit 32 is configured to receive downlink management signals 44D from the management controller 46. The central unit 32 distributes the downlink management signals 44D to the remote units 34(1)-34(N) to be distributed to the client devices 42(1)-42(N) communicatively coupled to the remote units 34(1)-34(N). The management controller 46 provides downlink management signals 44D to be distributed by the central unit 32 to any number of remote units 34(1)-34(N). Thus, to prevent the downlink management signals 44D destined for different remote units 34(1)-34(N) from interfering with each other, the central unit 32 time-division multiplexes the downlink electrical management signals 44D(E) into individual time slots in a downlink TDM management frame signal to be distributed to the remote units 34(1)-34(N). The central unit 32 converts the downlink TDM electrical management signal to downlink TDM optical management signals 44D(O) to be distributed over the at least one downlink optical fiber 36D to the remote units 34(1)-34(N) and the client devices 42(1)-42(N) in this embodiment. The central unit 32 can be configured to either broadcast all downlink electrical management signals 44D(E) to all remote units 34(1)-34(N), or provide specific downlink electrical management signals 44D(E) to individual remote units 34(1)-34(N).

In this embodiment, as will be described in more detail below, the downlink TDM optical management signals 44D(O) are combined with the downlink optical communications signals 38D(O) in different frequency bands and distributed over the same downlink optical fiber 36D. The remote units 34(1)-34(N) are configured to receive and convert downlink TDM optical management signals 44D(O) to downlink TDM electrical management signals, which can then be parsed by each remote unit 34(1)-34(N) to receive a particular downlink electrical management signal 44D(E) destined for the remote unit 34(1)-34(N).

The remote units 34(1)-34(N) are also configured to create and provide uplink management signals 44U to be distributed to the central unit 32 and the management controller 46. For example, it may be desired for the remote units 34(1)-34(N) to have the ability to provide the same type of management signals described above to the central unit 32, which are not related to RF communications services provided to the base station(s) 40. In this regard, uplink electrical management signals 44U(E) may be provided by the client devices 42(1)-42(N) to the remote units 34(1)-34(N). The remote units 34(1)-34(N) time-division multiplex the uplink electrical management signals 44U(E) into individual time slots in an uplink TDM electrical management frame signal. Thus, the management signals received by the central unit 32 from different remote units 34(1)-34(N) do not interfere with each other. The remote units 34(1)-34(N) combine the received uplink TDM electrical management signals with uplink electrical communications signals 38U(E), and are then configured to convert the combined uplink TDM electrical management signals and uplink electrical communications signals 38U(E) to combined uplink TDM optical management signals 44U(O) and uplink optical communications signals 38U(O) to be distributed over the at least one uplink optical fiber 36U to the central unit 32.

With continuing reference to FIG. 2, the central unit 32 is configured to convert the received combined uplink TDM optical management signals 44U(O) and uplink optical communications signal 38U(O) into combined uplink TDM electrical management signals 44U(E) and uplink electrical communications signal 38U(E). The central unit 32 then splits the uplink TDM electrical management signals 44U(E) from the uplink electrical communications signals 38U(E). The central unit 32 is configured to translate the uplink TDM electrical management signals 44U(E) into individual uplink electrical management signals 48U(E) from the different remote units 34(1)-34(N) and provide the uplink electrical management signals 48U(E) to the management controller(s) 46.

With continuing reference to FIG. 2, the remote units 34(1)-34(N) in the DAS 30 are communicatively coupled to the client devices 42(1)-42(N) by a separate electrical RF communications medium 50 and an electrical management communications medium 52. In this embodiment, the electrical RF communications medium 50 includes a separate downlink electrical RF communications medium 50D and an uplink electrical RF communications medium 50U. Alternatively, the downlink electrical RF communications medium 50D and uplink electrical RF communications medium 50U may be provided as a single electrical RF communications medium that carries both downlink and uplink RF communications signals. The electrical management communications medium 52 in FIG. 2 also includes a separate downlink electrical management communications medium 52D and an uplink electrical management communications medium 52U. Alternatively, the downlink electrical management communications medium 52D and the uplink electrical management communications medium 52U may be provided as a single electrical management communications medium that carries both downlink and uplink management communications signals. The electrical management communications mediums 50, 52 may be coaxial cables, for example.

In the present embodiments, the downlink optical fiber 36D and uplink optical fiber 36U could be provided as a single optical fiber to carry combined downlink optical communications signals 38D(O), downlink electrical TDM management frame signals 44D(O), uplink TDM optical management signals 44U(O), and uplink optical communications signals 38U(O). Time-division multiplexing of the downlink and uplink signals may be employed to allow these downlink and uplink signals to be communicated over a single optical fiber. Wave-division multiplexing (WDM), such as discussed in U.S. patent application Ser. No. 12/892,424, incorporated herein by reference in its entirety, may also be employed in this scenario to prevent collisions between downlink and uplink communications signals in the same or overlapping frequency bands.

FIG. 3 illustrates a control circuit 60 used to control toggling between transmit and receive mode in a system, such as a DAS, supporting time-division duplexing (TDD). The control circuit 60 can be used with, for example, distributed antenna systems, repeaters, and other hardware and architectures that provide wireless services. The control circuit 60 can be interposed, for example, between a radio source, such as a base station, and head end equipment of a distributed antenna system. The control circuit 60 can also be integrated into one or more components of a distributed antenna system, including head end equipment. For the purposes of illustration, the control circuit 60 is described below in the context of a distributed antenna system, although other implementations will be recognized by those of skill in the art. The control circuit 60 can include, or can be coupled to, a TDD switching circuit 64.

Still referring to FIG. 3, the control circuit 60 in this example is provided in a distributed communications system in the form of a DAS 61 in this example. The control circuit 60 includes a directional coupler 76 and two power detectors 80, 82. The transmit (Tx) power detector 80 measures Tx power, in decibels (dB), arriving in the downlink direction on a downlink path 83D, such as from the radio source 10, which is an indication of the power level received in the downlink direction on a downlink path 83D. The receive (Rx) power detector 82 measures Rx power, in dBm, generated by a Receive (Rx) amplifier 86, which is an indication of the power level received in the uplink direction on an uplink path 83U. Power received 'from the uplink direction' on the uplink path 83U can come from a system serviced by the radio source 10, such as from a DAS or a repeater. The decision by the control circuit 60 to toggle between the TDD Tx mode and TDD Rx mode is based on a comparison of the power level received from the radio source 10 and the power level received from the DAS 61. The Tx power detector 80 and the Rx power detector 82 may be provided in the form of diodes, as a non-limiting example.

The Tx/Rx comparator 90 makes the determination of whether the Tx power from the radio source 10 in the downlink path 83D is higher than the Rx power in the uplink path 83U. A Tx power higher than Rx power is one condition for toggling the TDD transmission mode to TDD Tx mode. In this example, the default TDD transmission mode for the control circuit 60 is TDD Rx mode, and a Tx power in excess of Rx power does not necessarily toggle the TDD transmission mode from TDD Rx mode to TDD Tx mode. Tx power can also be required to exceed a minimum threshold value to effect a switching, which is determined by a Transmit (Tx) power comparator 100. The threshold value can be variable and established to a desired level by a Tx power reference 102. A digital-to-analog converter (DAC) 103 may be included to convert the Tx power reference 102 from a digital signal to an analog signal if the Tx power comparator 100 is an analog comparator.

A Tx saturation comparator 108 compares the detected Tx power to a saturation level reference 110. A digital-to-analog converter (DAC) 111 may be included to convert the saturation level reference 110 from a digital signal to an analog signal if the Tx saturation comparator 108 is an analog comparator. The Tx saturation comparator 108 addresses situations in which the Tx power detector 80 is saturated due to high Tx power, and as a result the power levels measured by Tx power detector 80 and the Rx power detector 82 might be seen as equal. This condition might cause an error in toggling from TDD Tx mode to TDD Rx mode, or vice versa. If the output of the Tx saturation comparator 108 is "1", the assumption is that the Tx power detector 80 is saturated due to high power arriving from the radio source. In this case, the logic circuit 120 decides that the DAS should be toggled to TDD Tx mode.

The Rx amplifier 86, an input switch 130, an antenna switch 134, and a Transmit (Tx) amplifier 138 are illustrated as forming the TDD switching circuit 64 to effect the TDD Tx mode and TDD Rx mode in the system. Based on the state of the three comparators 90, 100, 108, the logic 120 decides if the switching circuit 64 will set the DAS to TDD Tx mode or TDD Rx mode. The logic circuit 120 schedules the toggling of the input switch 130 and the antenna switch 134. In order to avoid a situation where the antenna switch 134 is toggled under power when toggling from TDD Rx mode to TDD Tx mode, the logic circuit 120 first toggles the antenna switch 134 and then the input switch 130.

The logic circuit 120 can have three states based on the outputs of the comparators 90, 100, 108. A first state can correspond to when the receive/transmit comparator 90 determines that Rx power exceeds Tx power. In the first state, the switching circuit 64 receives an instruction through, for example, a digital control bit, "1" for TDD Tx mode, and "0" for TDD Rx mode, to maintain the DAS in receive mode. For example, the instruction may be provided on a Tx/Rx sense output 122 from the logic circuit 120. The logic circuit 120 may have more than one Tx/Rx sense output 122 if there is a need for other system in the DAS 61 to be switched between TDD Tx mode and TDD Rx mode. The outputs of the comparators 100, 108 are not relevant in this state. In the second state, the receive/transmit comparator 90 determines that Tx power exceeds Rx power, but the Tx power comparator 100 determines that Tx power does not exceed the Tx power reference 102. In the second state, the TDD switching circuit 64 is instructed to operate the DAS in receive mode. In the third state, if the Tx power is higher than the Rx power and the Tx power is higher than the Tx reference value, the TDD switching circuit 64 is instructed to operate the DAS in transmit mode. If the output of the Tx saturation comparator 108 is "1", indicating that the Tx power detector 80 is saturated due to high power arriving from the radio source 10, the switching circuit 64 is instructed to operate the DAS in transmit mode.

According to one aspect of the present embodiments, a simple and robust mechanism provides a simple and robust switching of a DAS, repeater, or similar component between TDD uplink (Rx) mode and TDD downlink (Tx) mode. The exemplary control circuit 60 uses simple components without a need for an expensive high directivity directional coupler required by conventional schemes.

The digital reference 102 and the saturation level reference 110 may be, for example, digital words that can be set digitally by software commands. The exemplary comparators are shown as comparators 90, 100, 108, although other components might be used. The exemplary power detectors 80, 82 are illustrated as diodes, although other components might be used.

The RF communications services supported by the distributed antenna systems disclosed in this application, such as the DAS 14, 30, or 61 may include, but are not limited to, US FCC and Industry Canada frequencies (824-849 MHz on uplink and 869-894 MHz on downlink), US FCC and Industry Canada frequencies (1850-1915 MHz on uplink and 1930-1995 MHz on downlink), US FCC and Industry Canada frequencies (1710-1755 MHz on uplink and 2110-2155 MHz on downlink), US FCC frequencies (698-716 MHz and 776-787 MHz on uplink and 728-746 MHz on downlink), EU R & TTE frequencies (880-915 MHz on uplink and 925-960 MHz on downlink), EU R & TTE frequencies (1710-1785 MHz on uplink and 1805-1880 MHz on downlink), EU R & TTE frequencies (1920-1980 MHz on uplink and 2110-2170 MHz on downlink), US FCC frequencies (806-824 MHz on uplink and 851-869 MHz on downlink), US FCC frequencies (896-901 MHz on uplink and 929-941 MHz on downlink), US FCC frequencies (793-805 MHz on uplink and 763-775 MHz on downlink), and US FCC frequencies (2495-2690 MHz on uplink and downlink), medical telemetry frequencies, WLAN, WiMax, WiFi, Digital Subscriber Line (DSL), and LTE, etc.

Figure 4:
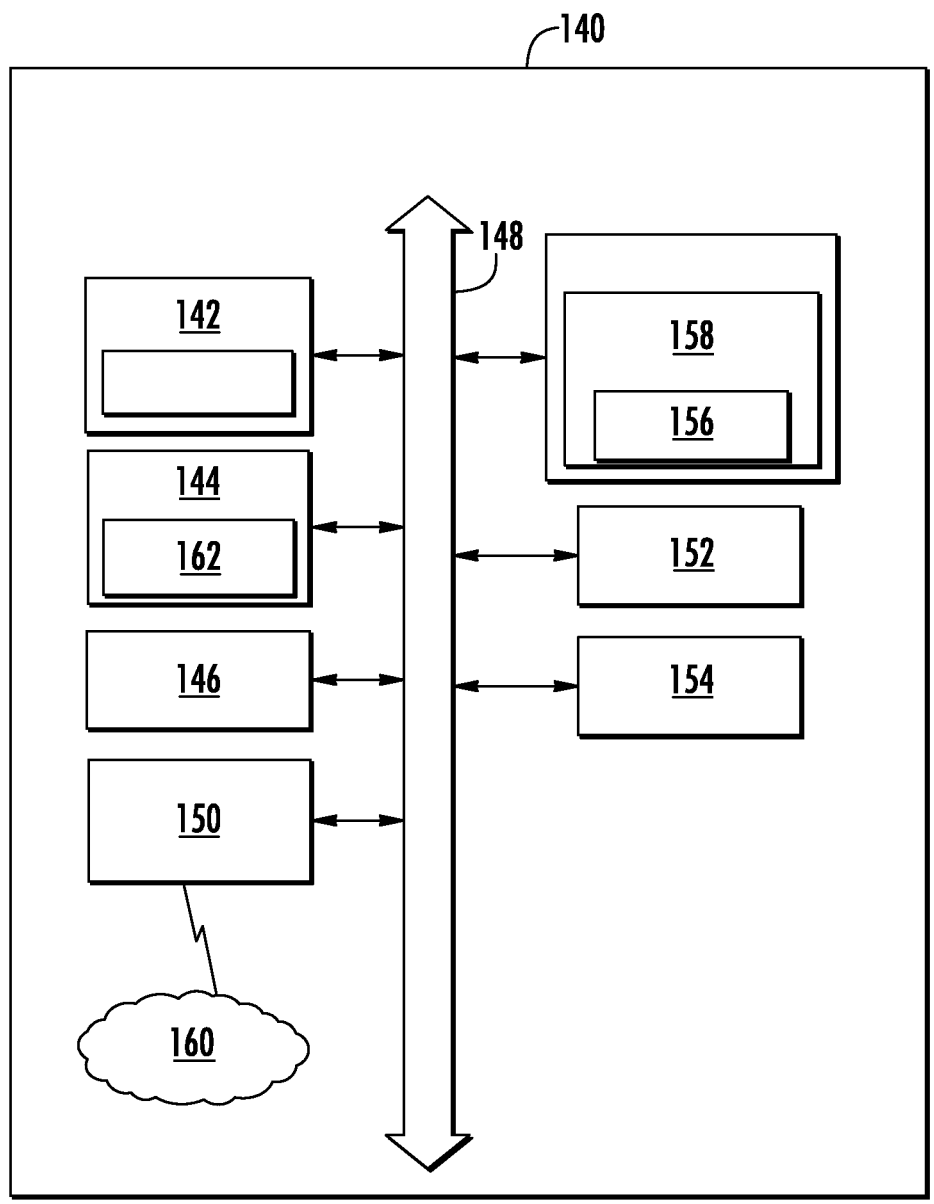
FIG. 4 is a schematic diagram of a generalized representation of an exemplary computer system that can be included in or interface with any of the exemplary distributed antenna systems and/or their components described herein, wherein the exemplary computer system is adapted to execute instructions from an exemplary computer-readable media.

Any of the distributed communications systems and/or DAS components disclosed herein, including but not limited to the control circuit 60 in FIG. 3, can include a computer system. For example, the logic circuit 120 of the control circuit 60 in FIG. 3 may be implemented in a computer system that includes a microprocessor or other controller that is configured to execute software to control the TDD transmission mode. In this regard, FIG. 4 is a schematic diagram representation of additional detail regarding an exemplary form of a computer system 140 that is adapted to execute instructions from a computer-readable medium to perform power management functions and can be included in a distributed antenna system component(s). The computer system 140 includes a set of instructions for causing the distributed antenna system component(s) to provide its designed functionality. The DAS component(s) may be connected (e.g., networked) to other machines in a LAN, an intranet, an extranet, or the Internet. The DAS component(s) may operate in a client-server network environment, or as a peer machine in a peer-to-peer (or distributed) network environment. While only a single device is illustrated, the term "device" shall also include any collection of devices that individually or jointly execute a set (or multiple sets) of instructions to perform any one or more of the methodologies discussed herein. The DAS component(s) may be a circuit or circuits included in an electronic board card, such as a printed circuit board (PCB) as an example, a server, a personal computer, a desktop computer, a laptop computer, a personal digital assistant (PDA), a computing pad, a mobile device, or any other device, and may represent, for example, a server or a user's computer. The exemplary computer system 140 in this embodiment includes a processing device or processor 142, a main memory 144 (e.g., read-only memory (ROM), flash memory, dynamic random access memory (DRAM) such as synchronous DRAM (SDRAM), etc.), and a static memory 146 (e.g., flash memory, static random access memory (SRAM), etc.), which may communicate with each other via the data bus 148. Alternatively, the processing device 142 may be connected to the main memory 144 and/or static memory 146 directly or via some other connectivity means. The processing device 142 may be a controller, and the main memory 144 or static memory 146 may be any type of memory.

The processing device 142 represents one or more general-purpose processing devices such as a microprocessor, central processing unit, or the like. More particularly, the processing device 142 may be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processing device 142 is configured to execute processing logic in instructions 162 for performing the operations and steps discussed herein.

The computer system 130 may further include a network interface device 140. The computer system 130 also may or may not include an input 142 to receive input and selections to be communicated to the computer system 130 when executing instructions. The computer system 130 also may or may not include an output 144, including but not limited to a display, a video display unit (e.g., a liquid crystal display (LCD) or a cathode ray tube (CRT)), an alphanumeric input device (e.g., a keyboard), and/or a cursor control device (e.g., a mouse).

The computer system 140 may or may not include a data storage device that includes instructions 156 stored in a computer-readable medium 158. The instructions 156 may also reside, completely or at least partially, within the main memory 144 and/or within the processing device 142 during execution thereof by the computer system 140, the main memory 144 and the processing device 142 also constituting computer-readable medium. The instructions 156 may further be transmitted or received over a network 160 via the network interface device 150.

While the computer-readable medium 158 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding or carrying a set of instructions for execution by the processing device and that cause the processing device to perform any one or more of the methodologies of the embodiments disclosed herein. The term "computer-readable medium" shall accordingly be taken to include, but not be limited to, solid-state memories, optical and magnetic medium, and carrier wave signals.

The embodiments disclosed herein include various steps. The steps of the embodiments disclosed herein may be performed by hardware components or may be embodied in machine-executable instructions, which may be used to cause a general-purpose or special-purpose processor programmed with the instructions to perform the steps. Alternatively, the steps may be performed by a combination of hardware and software.

The embodiments disclosed herein may be provided as a computer program product, or software, that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes a machine-readable storage medium (e.g., read only memory ("ROM"), random access memory ("RAM"), magnetic disk storage medium, optical storage medium, flash memory devices, etc.).

The various illustrative logical blocks, modules, and circuits described in connection with the embodiments disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A controller may be a processor. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The embodiments disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer-readable medium known in the art. Storage media may be coupled to the processor such that the processor can read information from, and write information to, the storage medium, or integral to the processor. The processor and the storage medium may reside in an ASIC. The ASIC may reside in a remote station as discrete components in a remote station, base station, or server.

As used herein, the terms "fiber optic cables" and/or "optical fibers" include all types of single mode and multi-mode light waveguides, including one or more optical fibers that may be upcoated, colored, buffered, ribbonized and/or have other organizing or protective structure in a cable such as one or more tubes, strength members, jackets or the like. The optical fibers disclosed herein can be single mode or multi-mode optical fibers.

We claim:

1. A control circuit for controlling switching between a time-division duplexing (TDD) transmit mode and a TDD receive mode in a system supporting TDD, the control circuit comprising:
   a first power detector configured to determine a first power level in a downlink direction on a downlink path;
   a second power detector configured to determine a second power level in an uplink direction on an uplink path;
   a receive/transmit comparator configured to compare the first power level to the second power level to provide a first indication that the system should be switched to TDD transmit mode when the first power level exceeds the second power level;
   a second power comparator configured to determine a second indication indicative of whether the first power level exceeds a value of a transmit power reference;
   a logic circuit coupled to the receive/transmit comparator for receiving the first indication, the logic circuit coupled to the second power comparator for receiving the second indication, wherein the logic circuit is configured to determine if the system should be switched to TDD transmit mode or TDD receive mode based at least in part on the received first indication from the receive/transmit comparator and the received second indication from the second power comparator; and
   a saturation comparator configured to provide a third indication of saturation of the first power detector by comparing the first power level with a saturation level reference.

2. The control circuit of claim 1, wherein the logic circuit coupled to the saturation comparator for receiving the third indication, wherein the logic circuit is configured to determine if the system should be switched to TDD transmit mode or TDD receive mode based at least in part on the received third indication of saturation from the saturation comparator.

3. The control circuit of claim 1, wherein the receive/transmit comparator and the second power comparator have as an input an output of the first power detector.

4. The control circuit of claim 1, wherein the logic circuit has a first state in which the second power level exceeds the first power level to indicate TDD receive mode.

5. A control circuit for controlling switching between a time-division duplexing (TDD) transmit mode and a TDD receive mode, the control circuit comprising:
   a first power detector configured to determine a first power level in a downlink direction on a downlink path;
   a second power detector configured to determine a second power level in an uplink direction on an uplink path;
   a receive/transmit comparator coupled to the first power detector, wherein the receive/transmit comparator compares the first power level to the second power level to provide a first indication that the system should be switched to TDD transmit mode when the first power level exceeds the second power level;

a second power comparator configured to determine a second indication indicative of whether the first power level exceeds a value of a transmit power reference; and a logic circuit coupled to the receive/transmit comparator for receiving the first indication, the logic circuit coupled to the second power comparator for receiving the second indication, wherein the logic circuit is configured to determine if the system should be switched to TDD transmit mode or TDD receive mode based at least in part on the received first indication from the receive/transmit comparator and the received second indication from the second power comparator, wherein the receive/transmit comparator and the second power comparator have as an input an output of the first power detector.

6. The control circuit of claim 5, further comprising a TDD switching circuit configured to effect the TDD transmit mode and the TDD receive mode for the system.

7. The control circuit of claim 6, wherein the TDD switching circuit comprises an input switch and an antenna switch located upstream and downstream the downlink path, respectively.

8. The control circuit of claim 7, wherein the TDD switching circuit comprises a transmit amplifier and a receive amplifier located between the input switch and the antenna switch.

9. A control circuit for controlling switching between a time-division duplexing (TDD) transmit mode and a TDD receive mode, the control circuit comprising:

a first power detector configured to determine a first power level in a downlink direction on a downlink path;

a second power detector configured to determine a second power level in an uplink direction on an uplink path;

a receive/transmit comparator coupled to the first power detector and to the second power detector, wherein the receive/transmit comparator compares the first power level to the second power level to provide a first indication that the system should be switched to TDD transmit mode when the first power level exceeds the second power level;

a second power comparator configured to determine a second indication indicative of whether the first power level exceeds a value of a transmit power reference;

a logic circuit coupled to the receive/transmit comparator for receiving the first indication and configured to receive the second indication, wherein the logic circuit is configured to determine if the system should be switched to TDD transmit mode or TDD receive mode based at least in part on the received first indication from the receive/transmit comparator and the received second indication from the second power comparator; and a TDD switching circuit configured to effect the TDD transmit mode and the TDD receive mode.

10. The control circuit of claim 9, further comprising a saturation comparator configured to provide a third indication of saturation of the first power detector by comparing the first power level with a saturation level reference, the logic circuit coupled to the saturation comparator for receiving the third indication, wherein the logic circuit is configured to determine if the system should be switched to TDD transmit mode or TDD receive mode based at least in part on the received third indication of saturation from the saturation comparator.

11. The control circuit of claim 9, wherein the logic circuit has a first state in which the second power level exceeds the first power level to indicate TDD receive mode.

12. The control circuit of claim 11, wherein the logic circuit has a second state in which the first power level exceeds the second power level and the first power level does not exceed the value of the transmit power reference to indicate TDD receive mode.

13. The control circuit of claim 12, wherein the logic circuit has a third state in which the first power level exceeds the second power level and the value of the transmit power reference to indicate TDD transmit mode.

14. A control circuit for controlling switching between a time-division duplexing (TDD) transmit mode and a TDD receive mode in a system supporting TDD, the control circuit comprising:

a first power detector configured to determine a first power level in a downlink direction on a downlink path;

a second power detector configured to determine a second power level in an uplink direction on an uplink path;

a receive/transmit comparator coupled to the first power detector and to the second power detector, wherein the receive/transmit comparator compares the first power level to the second power level to provide a first indication that the system should be switched to TDD transmit mode when the first power level exceeds the second power level;

a second power comparator configured to determine a second indication indicative of whether the first power level exceeds a value of a transmit power reference; and a logic circuit configured to determine if the system should be switched to TDD transmit mode or TDD receive mode based at least in part on a received first indication from the receive/transmit comparator and a received second indication from the second power comparator, wherein the logic circuit has a first state in which the second power level exceeds the first power level to indicate TDD receive mode, and the logic circuit has a second state in which the first power level exceeds the second power level.

15. The control circuit of claim 14, wherein the receive/transmit comparator and the second power comparator have as an input an output of the first power detector.

16. The control circuit of claim 14, wherein the logic circuit has a third state in which the first power level exceeds the second power level and the value of the transmit power reference to indicate TDD transmit mode.

17. The control circuit of claim 14, further comprising a TDD switching circuit configured to effect the TDD transmit mode and the TDD receive mode for the system, and a directional coupler configured to receive and transmit communications between the TDD switching circuit and a radio source.

* * * * *